March 6, 1945. H. K. LEONARD 2,370,805
SENSING MECHANISM
Filed Nov. 17, 1943 4 Sheets-Sheet 4
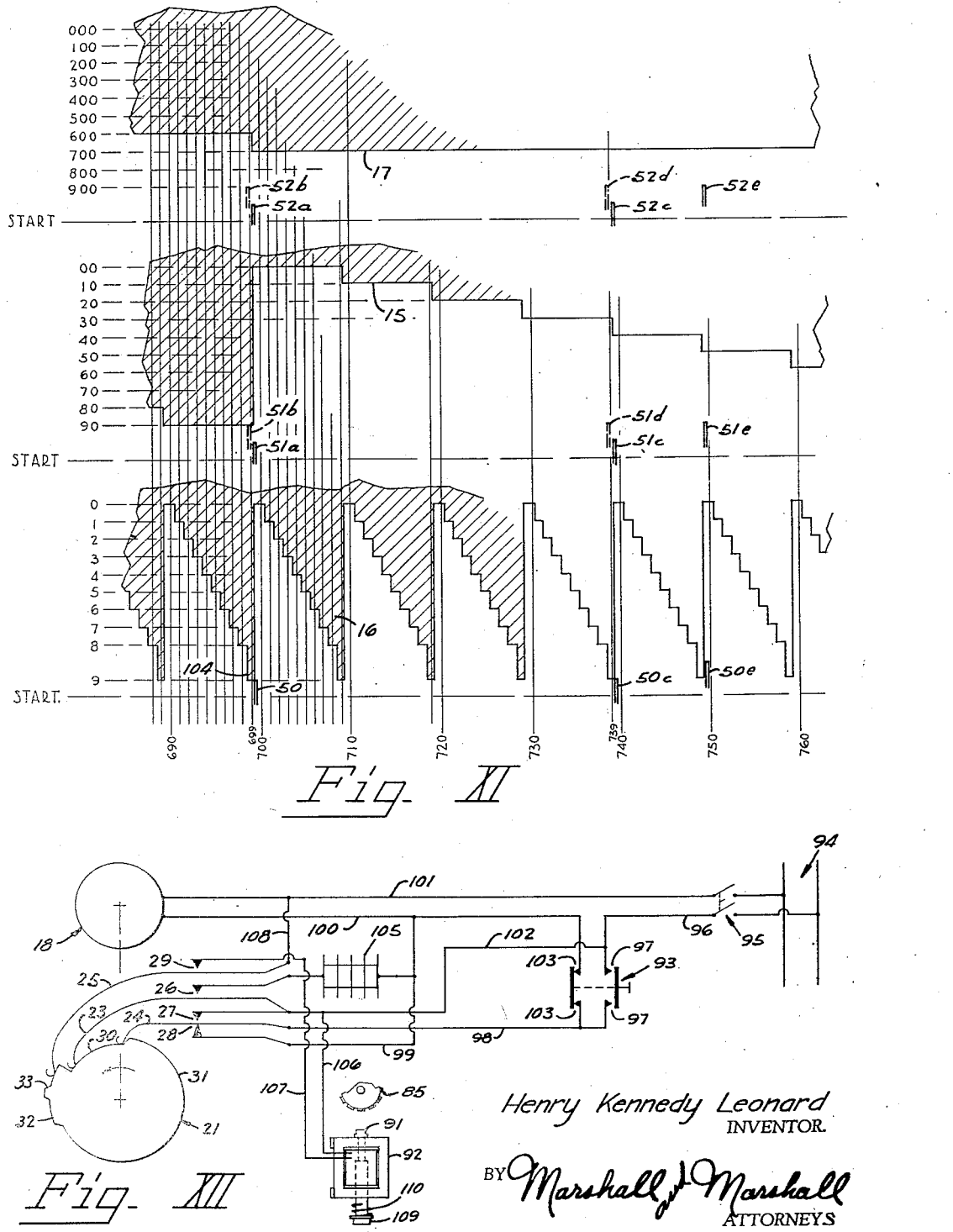
Fig. XI
Fig. XII
Henry Kennedy Leonard
INVENTOR.
BY Marshall & Marshall
ATTORNEYS Patented Mar. 6, 1945

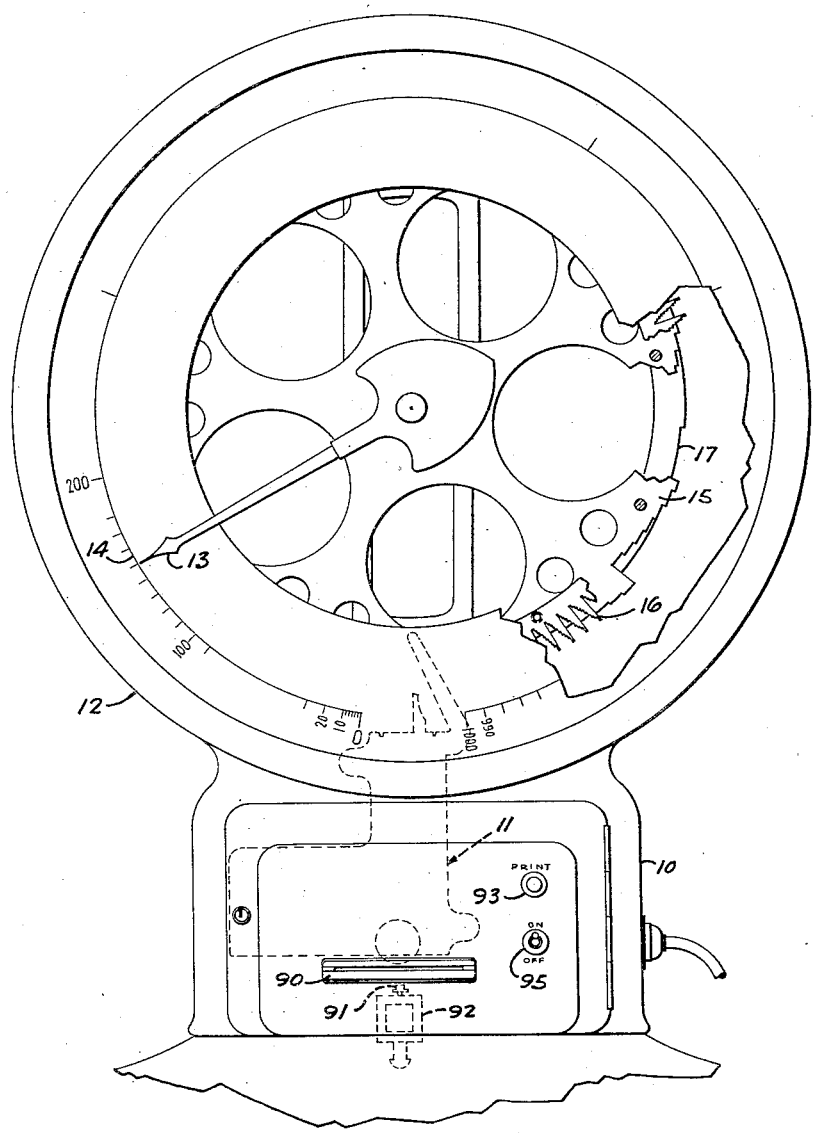
Fig. I
Henry Kennedy Leonard
INVENTOR.
BY Marshall & Marshall
ATTORNEYS March 6, 1945.  H. K. LEONARD  2,370,805
SENSING MECHANISM
Filed Nov. 17, 1943  4 Sheets-Sheet 2
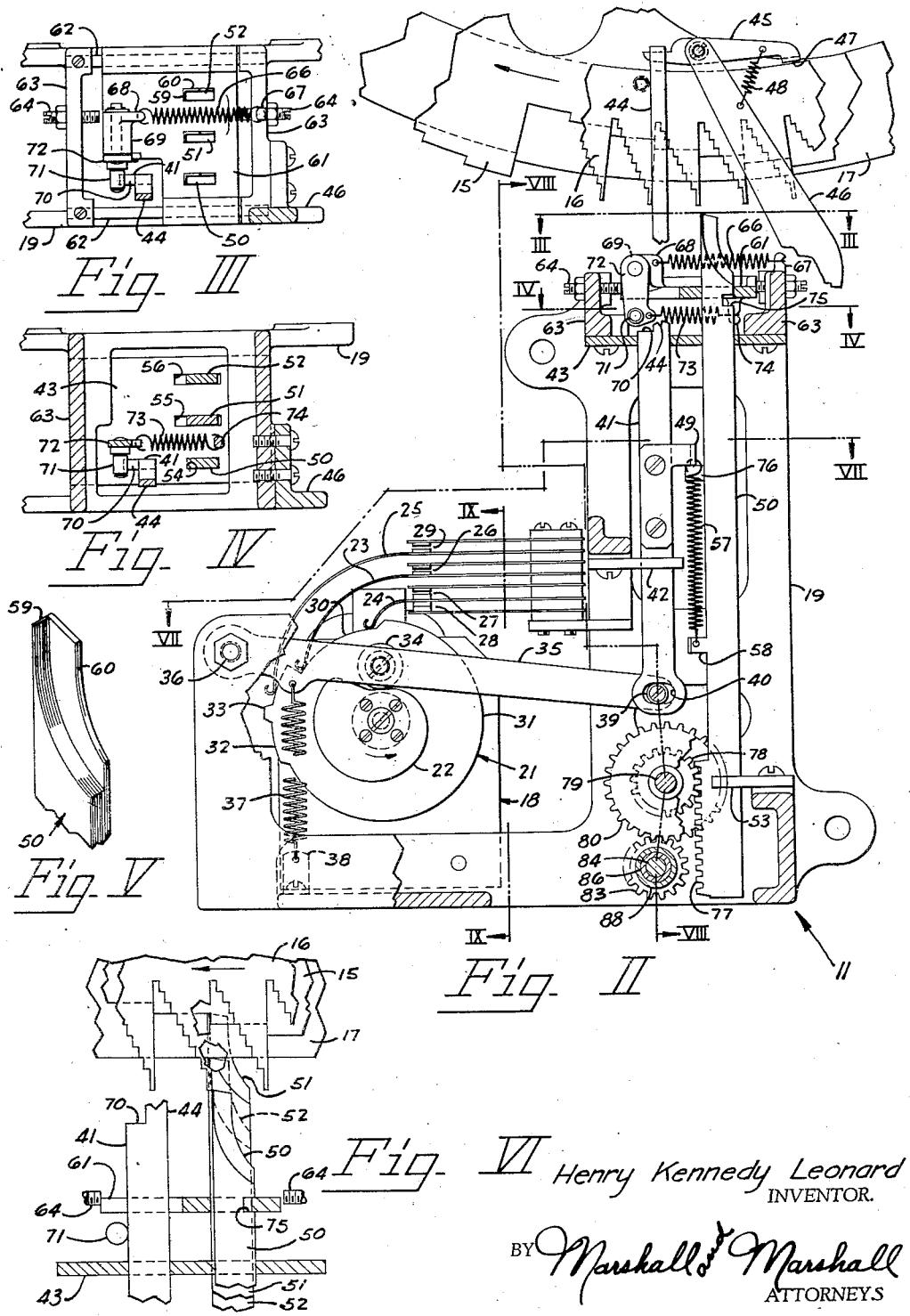
Henry Kennedy Leonard
INVENTOR.
BY Marshall & Marshall
ATTORNEYS

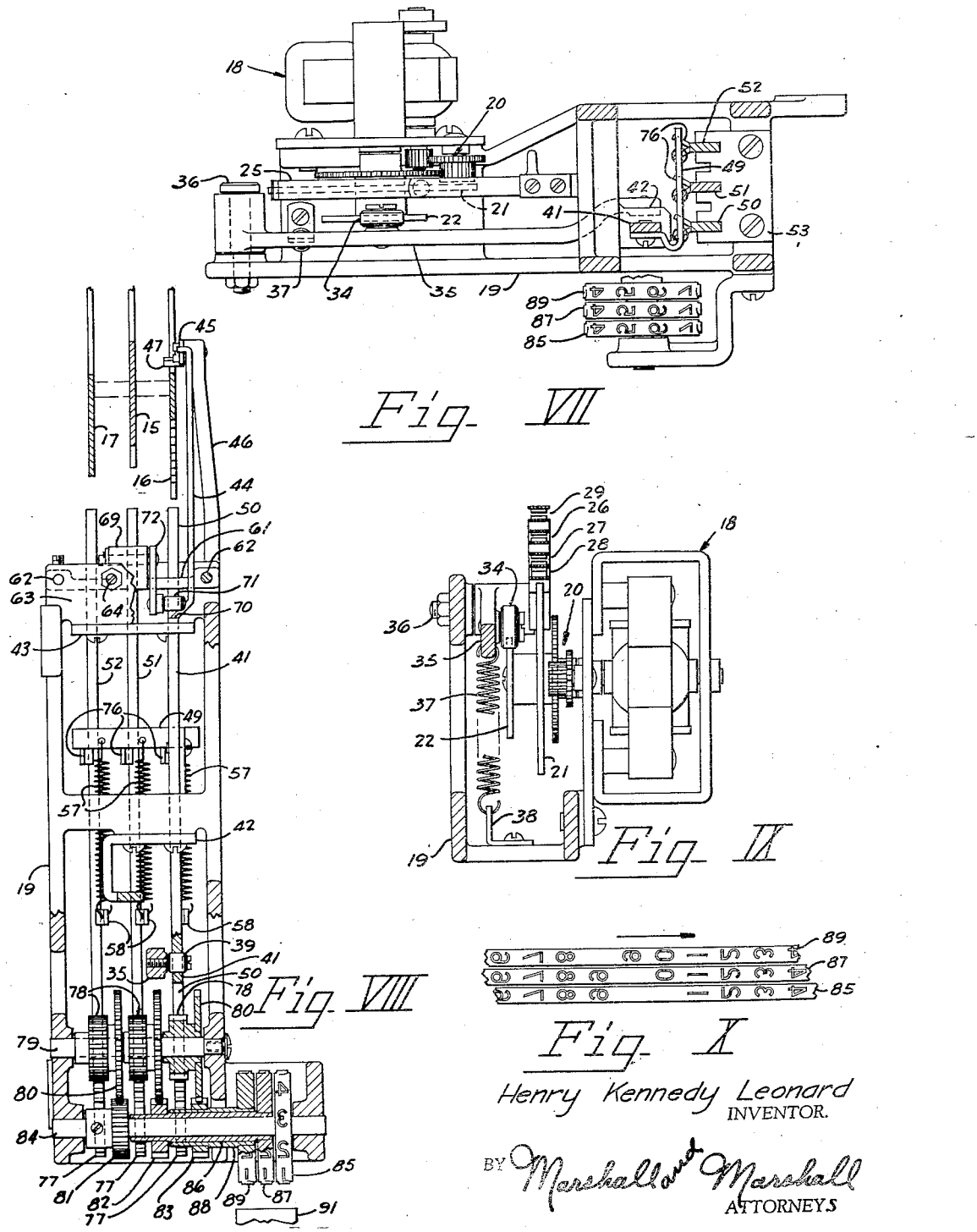

2,370,805

UNITED STATES PATENT OFFICE 2,370,805

SENSING MECHANISM

Henry Kennedy Leonard, Toledo, Ohio, assignor to Toledo Scale Company, Toledo, Ohio, a corporation of New Jersey Application November 17, 1943, Serial No. 510,639

6 Claims. (Cl. 235—1)

This invention relates to sensing mechanisms of the type employing stepped members which are moved in response to the conditions being measured and the stepped edges of which are engaged by sensing members to set up auxiliary printing or recording mechanism.

Sensing mechanisms of this type usually have a separate member for each order of values, i. e., for units, tens, hundreds, etc. The size of the steps in each of the members is proportional to the value of the increment represented by the particular member. If the members are arranged so that, for example, ten small steps representing units are in a line with one of the steps representing tens and in turn ten of the steps in the member representing tens are in line with one of the steps in the member representing hundreds, when the members are moved in response to a change in the condition being measured, the three series of steps pass any particular selection point in accordance with the values of conditions which are represented by the steps. Selecting or sensing means of some kind are moved into contact with these steps on a line perpendicular to the steps and the auxiliary printing or indicating means are set up to record a value corresponding to the particular steps in the series which are engaged.

When the value to be recorded has a magnitude very close to a line of demarcation between successive "100" or "10" steps, for example, a value of 299 or 39 or any other value ending in either 9 or 99, the sensing mechanism very easily may engage the edges of the members incorrectly, recording for example, 399, 209 or 309 instead of 299. Values like this are referred to as "critical."

Therefore, devices employing sensing mechanisms of the type disclosed usually are equipped with some means for moving the stepped members a slight distance in one direction or the other when a critical value is being sensed. These means, however, usually require much additional mechanism and are themselves liable to failure.

The difficulty of making "critical" selections is aggravated where the total capacity of the instrument is divided into a large number of small increments, because the stepped member representing units then has very small steps and the difference between positions representing successive values, for example, between 299 and 300 is very little. These conditions are present in many instruments, for example, weighing scales where the capacity of the scale must be divided into as many as 1000 parts and yet where the stepped members must be kept as small and light as possible in order to obviate errors caused by their inertia.

It is an object of this invention to provide a sensing device for sensing the values represented by those steps in a plurality of stepped value designating members which are moved into sensing position by a condition under measurement without requiring the stepped members to be moved in order to prevent incorrect selections of higher orders of increments of value, when critical values are being sensed.

More specific objects and advantages are apparent from the description, in which reference is had to the accompanying drawings illustrating a preferred form of device embodying the invention.

In the drawings:

Fig. I is a fragmentary view, in elevation, with parts being broken away, of a printing weighing scale embodying the invention.

Fig. II is a greatly enlarged fragmentary view in elevation of sensing mechanism embodying the invention.

Fig. III is a horizontal sectional view taken substantially on the line III—III of Fig. II.

Fig. IV is a horizontal sectional view taken substantially on the line IV—IV of Fig. II.

Fig. V is a further enlarged fragmentary detailed perspective view of a portion of a sensing member.

Fig. VI is a fragmentary view showing certain principles of operation of the device.

Fig. VII is a horizontal sectional view taken substantially on the line VII—VII of Fig. II.

Fig. VIII is a vertical sectional view taken substantially on the line VIII—VIII of Fig. II.

Fig. IX is a vertical sectional view taken substantially on the line IX—IX of Fig. II.

Fig. X is a fragmentary development of the surfaces of the type-bearing elements of the invention.

Fig. XI is a greatly enlarged projection on a straight line basis of the fragments of the edges of the stepped members constituting a part of the invention and showing operational principles of the invention.

Fig. XII is a schematic wiring diagram of electrical apparatus for controlling the operation of the mechanism shown in Figs. I and II.

The specific drawings and the specific description that follows merely disclose and illustrate the invention and are not intended to impose limitations upon the claims.

A weighing scale equipped with a device embodying the invention has a column 10 enclosing sensing mechanism 11 and on top of which there is mounted a dial housing 12. The dial housing 12 encloses load counterbalancing mechanism (not shown) which drives a rotary indicator 13 cooperating with an annular weight indicia-bearing chart 14. A disk 15 also is rotated by the load counterbalancing mechanism in response to and in proportion to the value sof loads weighed on the scale. The periphery of the disk 15 is stepped and each of the steps cut therein represent ten of the smallest increments of weight. Two annuli 16 and 17 are mounted on the disk 15 and also are stepped around their periphery, each of the steps in the annulus 16 representing a single increment of weight and each of the steps in the annulus 17 representing one hundred increments of weight. Although in the drawings the members representing units and hundreds are illustrated as annuli, the also may be disks if desired.

Fig. XI is a straight line projection of the edges of the three stepped members, the disk 15 and the two annuli 16 and 17. Vertical distances in Fig. XI correspond to radial distances in Fig. II and in the actual device, and horizontal distances in Fig. XI correspond to peripheral or circumferential distances in Fig. 1 and in the actual device. The three fragments of the stepped members are partially cross-hatched in Fig. XI. The horizontal straight line length of each of the steps in the edge of the annulus 16 correspond to one increment of weight or in the embodiment shown, to a value of one pound. Similarly the horizontal length of each of the steps in the edge of the disk 15 corresponds to a value of ten increments of weight and the horizontal length of each of the steps in the edge of the annulus 17 to a value of one hundred increments of weight. The height or radial length of each of the steps cut in the edges of the disk 15 and annuli 16 and 17 is equal and this distance represents one of the increments of weight corresponding to the stepped members, i. e., one pound, ten pounds or one hundred pounds depending upon the stepped member in question.

The three stepped members are designed to rotate in a clockwise direction in response to increases in loads of weight on the scale, the steps progressively passing by any given reference point in accordance with the value of the particular load being weighed. The sensing mechanism 11 is so located that when a load is weighed on the scale the steps in the stepped members 15, 16 and 17 which correspond to the value of the load are moved into sensing position. The sensing mechanism is actuated by a motor 18 Figs. II, VII and IX, which is secured to a main frame 19 of the device. Through gearing 20, the motor 18 rotates a pair of cams 21 and 22 (counterclockwise in Fig. II). The edge of the cam 21 is engaged by riders 23, 24 and 25. The rider 23 controls the opening and closing of a contact 26, the rider 24 controls the opening and closing of a pair of make-before-break contacts 27 and 28 and the rider 25 controls the opening and closing of a contact 29. The periphery of the cam 21 is cut into a short low surface 30, a long medium height surface 31, a short high surface 32 and a still shorter and higher surface 33. The edge of the cam 22 is engaged by a roller 34 which is mounted on a rocker arm 35 pivoted on a stud 36 projecting from the main frame 19. A spring 37 is engaged between the rocker arm 35 and a clip 38 (Fig. IX) secured to the main frame 19 and normally holds the rocker arm 35 in the position in which it is shown in Fig. II. A roller 39 mounted on the free end of the rocker arm 35 is loosely engaged in an elongated hole 40 in the lower end of a vertically slidable actuating bar 41 (see also Fig. VIII). The actuating bar 41 slides in slots cut in a horizontal bracket 42 and in a horizontal plate 43 both of which are secured to the upright portion of the main mechanism frame 19. The upper end of the actuating bar 41 is formed into a finger 44, which extends around and above the innermost edge of the stepped annulus 16 and the end of which is engaged with one end of a brake 45 pivotally mounted on the uppermost part of an arm 46 of the main frame 19. The brake 45 has a brake shoe 47 which is engageable with the inner edge of the annulus 16 when a sensing operation is being performed and is urged into contact therewith by a spring 48 hooked between the brake 45 and the arm 46.

A formed bracket 49, Figs. II, VII and VIII is bolted to the actuating bar 41 and has a horizontal arm extending across and behind three vertically slidable sensing bars 50, 51 and 52 which are associated with the stepped units annulus 16, the stepped tens disk 15 and stepped hundreds annulus 17 respectively. The three sensing bars 50, 51 and 52 are guided in their vertical movement by a comb 53 located near the bottom of the frame 19 and extend through three slots 54, 55 and 56 cut in the horizontal guide plate 43. The slot 54 is just large enough to permit the sensing bar 50 to slide vertically and the slots 55 and 56 are longer than the bars 51 and 52 are wide to permit slight rocking movement of these two bars. (See Fig. IV.) The sensing bars 50, 51 and 52 are driven upwardly by three springs 57 which are hooked in the bracket 49 and in tabs 58 formed on the sensing bars 50, 51 and 52. The springs 57 form resilient connections between the actuating bar 41 and the sensing bars so that when the actuating bar 41 is moved through its fixed stroke by the rocker arm 35, the sensing bars are moved upwardly by the tension of the springs 57, but when they engage steps in the edges of the stepped members they can stop and extension of the spring 57 permits the actuating bar 41 to continue to the end of its stroke.

The upper end of each of the sensing bars 50, 51 and 52 (illustrated in Fig. V) is milled out to form a thin engaging edge 59 which extends across the respective one of the stepped members and a cut back strengthening section 60. By so forming the upper ends of the bars, the engaging edge 59 can be made very thin for accuracy in its engagement with the steps of the edges of the stepped members.

The three sensing bars also extend through three slots cut in a slide 61 (Figs. II, III, VI and VIII) which is mounted for limited horizontal movement on a pair of rods 62 secured in cross members 63. The amount of horizontal movement of the slide 61 is controlled by a pair of stops 64 which are adjustably threaded through the cross members 63 and engageable with the edges of the slide 61. The slide normally is held to the right (Figs. II and III) by a spring 66 engaged between a finger 67 on the cross bar 63 and an ear 68 formed on a boss 69 extending upwardly from the slide 61. The slide 61 may be moved to the left under certain conditions by the engagement of a shoulder 70 cut in the actuating bar 41 with a roller 71 mounted in the end of the arm of a bell crank 72 which is pivoted in the boss 69. A spring 73 is engaged between the end of the arm of the bell crank 72 and a finger 74 extending downwardly from the slide 61. A notch 75 is cut in the edge of the unit sensing bar 50 and under certain conditions the edge of the slot in the slide 61 through which this sensing bar passes is engageable in this notch to permit the slide to move horizontally.

The actuating bar 41 raises the sensing bars 50, 51 and 52 by means of the springs 57 and returns the sensing bars by means of the engagement between the cross arm of the bracket 49 and tabs 76 (Figs. VII and VIII) which are formed at the rear of the sensing bars and engaged beneath the cross arm of the bracket 49.

In the lower end of each of the sensing bars 50, 51 and 52 there is cut a rack 77 (Figs. II and VIII) and each rack 77 meshes with a pinion 78 loosely journaled on a horizontal shaft 79 mounted in the frame 19. Each of the pinions 78 has a gear 80 secured to its hub, each of these gears in turn being meshed with one of three pinions 81, 82 and 83. The pinion 81 is fixed on a shaft 84 which is journaled in the frame 19, and on the other end of which a type-bearing drum 85 is secured. The type borne by the drum 85 are hundreds type and serve to print the value of loads on the scale represented by the hundreds step in the stepped annulus 17 with which the hundreds sensing bar 52 is engaged when sensing takes place. The pinion 82 is fixed on one end of a sleeve 86 which is concentrically mounted on the shaft 84 and which mounts on its other end a tens type-bearing drum 87 located adjacent the hundreds type-bearing drum 85. The tens drum 87 thus designates the value of the step in the edge of the stepped disk 15 with which the tens sensing bar 51 is engaged during sensing. The pinion 83 is fixed on a sleeve 88 rotatably mounted on the sleeve 86 and similarly driving a units type-bearing drum 89 located adjacent the drum 87.

Indications set up on the type-bearing drums 85, 87 and 89 are printed on cards or other impression receiving media inserted through a guide 90 (Fig. I) by means of a printing hammer 91 which is struck against the type on the drums by the action of a printing solenoid 92.

Operation

When a load has been placed upon a weighing scale equipped with mechanism embodying the invention and the stepped members 15, 16 and 17 have been rotated in response to this load a printed indication of its weight is afforded through the operation of the sensing mechanism. The sensing mechanism is operated by means of the motor 18 which when operated under the control of the single cycle device embodied in the cam 21 and the electrical elements associated therewith is preferably of the "shaded-pole" type. (Although other single cycle mechanisms may be used and the mechanism herein disclosed is shown only by way of illustration.)

Operation of the sensing mechanism is initiated by a "print" push button switch 93 (Figs. I and XII) which permits current to flow from a power source 94 through a main switch 95 (see also Fig. I) and through a lead 96 to normally opened contacts 97 of the switch 93 and then through a lead 98, the contact 28, a lead 99 and a lead 100 to the motor 18 and then through a lead 101 to the opposite side of the line. This energizes the motor, which rotates the cams 21 and 22 in a counterclockwise direction as shown in Figures II and XII. The cam rider 24 immediately climbs up on the medium surface 31 of the cam 21 and closes the contact 27 without opening contact 28. The push button switch 93 then can be released and current flows from the lead 96 through a lead 102 to the contact 27, the lead 98, normally closed contacts 103 of the push button switch 93 and the lead 100 to the motor 18 and then through the lead 101 to the opposite side of the line.

Rotation of the cam 22 swings the rocker arm 35 which slides the actuating bar 41 upwardly. The finger 44, the top end of the bar 41, is removed from contact with the end of the brake 45 and the spring 48 swings the brake shoe 47 into contact with the edge of the annulus 16 firmly to hold the stepped members during sensing. The springs 57 transmit the upward movement to the sensing bars 50, 51 and 52. Subsequent operation of the sensing mechanism depends upon whether the value to be sensed is "critical" or not. As explained, "critical" values are those ending in "9" or in "99" and more particularly the latter. If the value to be sensed is, for example, 699, so that provision must be made to prevent the erroneous sensing of 799 or 709, the sensing bar 50 first engages that one of the "9" steps in the series of unit steps cut in the edge of the stepped member 16 which represents the units value and is moved into sensing position. As can be seen by reference to Figs. VI and XI, the "9" steps extend a substantially greater distance radially than do the remaining ones of the unit steps and also extend outside the edges of the stepped members 15 and 17. In Fig. XI a "9" step, designated by the reference character 104, is in line with the proper steps of the stepped members 15 and 17 to designate a value of 699. Because the "9" step extends this additional distance radially from the stepped members, it is first engaged by its sensing bar 50 when the sensing bars are moved upwardly. The mechanism is so arranged that at the time the sensing bar 50 engages the end of the "9" step 104, the notch 75 (Figs. II and VI) cut in the sensing bar 50 is in line with the slide 61 and thus when the shoulder 70 in the actuating bar 41 engages the roller 71 to cam the bell crank 72 to the left, the slide 61 also is moved to the left and engaged in the notch 75. When the slide 61 is moved to the left the upper ends of the tens and hundreds sensing bars 51 and 52 are rocked slightly to the left and moved from the position indicated by the reference characters 51a and 52a in Fig. XI to the positions shown in dotted lines and indicated by the reference characters 51b and 52b in Fig. XI (this position also is shown in Fig. VI where the sensing bars 51 and 52 are shown after shifting). This movement to the left insures the engagement of these two sensing bars with the steps in the stepped members 15 and 17 which have the value desired, i. e., the "600" step in the stepped member 17 and the "90" step in the stepped member 15 and eliminates any possibility of the sensing bar 52 engaging the "700" step in the stepped member 17 or the sensing bar 51 engaging the "00" step in the stepped member 15.

In order to compensate for the thickness of the sensing edges 59 of the sensing member, the "9" steps in the stepped member 16 and the "90" steps in the stepped member 15 have less width than the other steps in these members. The width of these steps is the same as that of others, less the thickness of the sensing edges 59.

The cams 21 and 22 continue to rotate and shortly the rider 23 climbs up on the surface 31 closing the contact 26. This inserts a half-wave rectifier 105 in parallel with the push button switch contacts 103 but does not affect the operation because current continues to flow through the push button contacts.

As the actuating bar 41 continues to move upwardly it moves the sensing bars 51 and 52 until they engage the steps in the stepped members 15 and 17 which correspond to the tens and hundreds values of the value being sensed. At this point the racks driving the type-bearing drums have rotated such drums until numerals corresponding to the value being sensed are in printing position. In Fig. X there is shown the spacing of the type borne by the drums 85, 87 and 89. It should be noticed that the type figures on all the drums are in line except the "9's" which are spaced to compensate for the distance the various sensing bars move before contacting the "9," "90" or "900" steps in their respective disks and also to compensate for the increased length of the "9" steps in the stepped member 16. As the sensing bars move upwardly the type drums move in the direction of the arrow in Fig. X and each of the type borne by each of the drums moves into printing position as the associated sensing bar reaches the position of the corresponding step in the stepped members. It also should be noted that, inasmuch as the maximum capacity of the particular printing means disclosed is 999, the "0" type is left off the hundreds drum 85 to provide for the printing of values less than 100 as "37" or "98" instead of "037" or "098."

The actuating bar continues to move upwardly a slight distance further extending the springs 57 securely to position the sensing bars against the respective steps contacted. The cam rider 24 climbs up on the high cam surface 32 opening the contact 28 which, if the push button 93 has been released as soon as the device started, has no effect on the operation of the motor. However, if the push button was not released and the contacts 97 have been held closed to this point and current has been delivered to the motor 18 through the circuit made up of the lead 96, contacts 97, lead 98, contact 28, leads 99 and 100, opening the contact 28 breaks the circuit and the only current which can reach the motor then must pass through the lead 102, the contact 26 and the half-wave rectifier 105, the lead 99 and the lead 100. This safety provision is made to obviate repeat cycles which would occur if the push button switch were held closed during the entire cycle of operations. In the event that the push button has been held in, the operation of the motor is slowed down when the rider 24 hits the surface 32 causing the shaded-pole motor to be operated by half-wave rectified current which rotates it very slowly and signals the operator to release the push button. However, if the push button has not been held in and current has been reaching the motor through the circuit controlled by the contacts 103, the opening of the contact 28 does not affect the motor operation.

As the cam 21 rotates further, the rider 24, after riding over the high spot 33 without altering the circuit connections, drops off the surface 32 onto the low surface 30 to open the contact 27. If the push button switch 93 was released as soon as the device started, current has been reaching the motor through the lead 102, the contact 27, the lead 98 and the contacts 103 of the switch. When the contact 27 is opened, current no longer can flow through this circuit and it, therefore, flows through the lead 102, contact 26 and half-wave rectifier 105 to the lead 99 and 100 and the motor 18 and then to the lead 101 and the opposite side of the line. As described, this causes the motor to rotate more slowly for the remaining portion of the cycle.

The cams continue to rotate, the surface of the cam 22 now being concentric and thus holding the sensing bars against the contacted ones of the steps in the stepped members. The cam rider 25 rides up on the short high surface 33. This momentarily closes the contact 29 and current flows through the lead 96, the lead 102, a lead 106, the coil of the solenoid 92, a lead 107, the contact 29 and a lead 108 to the lead 101 and the opposite side of the line. This energizes the solenoid 92 and moves its core rod 109 upwardly striking the printing hammer 91 against the impression receiving medium positioned beneath the type-bearing drums 85, 87 and 89 (see Figure VIII). The shock of this blow is cushioned by a coil spring 110 which surrounds the core rod 109. After the impression has been taken the contact 29 is at once opened and the solenoid core rod 109 falls to its lower position.

The roller 34 reaches the return surface of the cam 22 and the rocker arm 35 and actuating bar 41 are returned downwardly which permits the slide 61 to be returned to the right by the spring 66, disengaging the slide from the notch 75 in the sensing bar 50, and the sensing bars 50, 51 and 52 are returned to their zero position by the engagement of the bracket 49 with the tabs 76. This restores the type-bearing drums 85, 87 and 89 to their zero position. The brake 45 is swung to lift the brake shoe off the annulus 16. The cam rider 23 then drops off the surface 32 opening the contact 26 and bringing the cycle to an end.

The slide 61 always is cammed sideways when the value to be sensed has a unit value of more than 8½ but less than 9½. This selection and operation is controlled by the widths of the "9" units steps and the width of the sensing edges 59 of the sensing bars. The "9" steps are so located in the stepped member 16 that the leading edge of the sensing edge 59 engages one side of the "9" step when the value to be sensed is 8½ or more and the following edge of the sensing edge 59 passes the other edge of the "9" step when the value to be sensed is 9½ or more.

Operation at the value of 739 is illustrated in Fig. VI and in Fig. XI where the sensing bars are shown at 50c, 51c and 52c before the shifting takes place and at 51d and 52d after being shifted. As can be seen in Fig. VI, when the edge of the sensing edge 59 of the sensing bar 50 engages a "9" step the sensing bar is so positioned that the slide 61 can enter the notch 75 (as already described). This not only permits the slide to move to the left and thus moves the sensing bars 51 and 52 a sufficient distance to insure their engagement with the proper ones of the steps in the tens and hundreds stepped members but it also firmly holds the sensing bar 50 against any further longitudinal movement and thus prevents its inadvertent disengagement from the "9" step.

If the value to be sensed is not "critical" the sensing bar 50 does not engage a "9" step and the notch 75 is beyond the slide 61 before the shoulder 70 of the actuating bar 41 strikes against the roller 71. Therefore, when the shoulder 70 engages the roller 71, because the slide 61 is held to the right by the sensing bar 50, the spring 73 permits the bell crank 72 to be swung without moving the slide 61 and the sensing bars 51 and 52 are not shifted but are moved upwardly in a straight line to engage the steps of the stepped members 15 and 17. This condition is shown in Fig. XI with the sensing bars in the positions designated as 50e, 51e and 52e.

The embodiment of the invention that has been disclosed may be modified to meet various requirements.

Having described the invention, I claim:

1. In a device for exhibiting the numerical value of a condition under measurement, in combination, a condition responsive structure, there being groups of series of steps formed on said structure, the steps in each of said groups representing different increments of value, a sensing member movable into contact with that step in each of said groups of steps representing that portion of the total value of the condition under measurement measurable in terms of that increment represented by said groups of steps, the ultimate one of the steps in each of said series of steps in that one of said groups of steps representing the smallest increments of value being adjacent the line of demarcation between successive ones of the steps in the others of said groups of steps and being first contacted by its respective sensing member when the smallest increment value of the value being sensed lies within the compass of such ultimate step, said sensing members being adapted to operate value exhibiting mechanism in accordance with the values represented by the steps contacted, means for moving said sensing members into contact with their respective groups of steps and means operable when one of said ultimate steps is first contacted by its sensing member for shifting the others of said sensing members away from such line of demarcation into contact with those steps having lower values in the others of said groups of steps, thereby preventing erroneous contacting of higher value representing steps.

2. In a device for exhibiting the numerical value of a condition under measurement, in combination, a condition responsive structure, there being groups of series of steps formed on said structure, each of said groups corresponding to a different order of digits in the values to be sensed, each step in each of said series representing a certain value in terms of that digit corresponding to that group in which said series is located, each series of steps in those of said groups having lower digit values being equal in value to a step in those series having the next higher digit value, a sensing member associated with each of said groups of steps, said sensing members being movable into contact with those steps in said groups of steps corresponding to the value of the condition under measurement, the ninth step in each series of steps in that group of steps corresponding to units being first contacted by its respective sensing member when the value being sensed has a unit value of between 8½ and 9½, shiftable means movable upon contact of such sensing member with one of said ninth steps to shift the others of said sensing means out of line with the demarcations between successive steps on successive series of steps in those groups of steps representing tens and hundreds, said sensing members being adapted to operate value exhibiting mechanism in accordance with the values represented by those steps contacted and actuating means moving said sensing members into contact with said steps and for operating said shiftable means.

3. In a device for exhibiting the numerical value of a condition under measurement, in combination, a member positionable by the condition responsive device, a plurality of stepped surfaces on the member comprising a series of stepped surfaces for each order of digits in the numerical value exhibited and steps in each series for each digit in such order with the last steps in that series representing units being adjacent the demarcation lines between steps of the other series, a plurality of fingers one for each series of stepped surfaces engageable with the stepped surfaces, that finger engageable with the units series of steps being engageable with the last steps prior to any engagement between other fingers and other series of surfaces, means actuated by engagement between the units finger and the last steps of the units series of surfaces for shifting the other fingers to vary the point of engagement of the other fingers on their respective series of stepped surfaces, and means for moving the fingers into contact with the stepped surfaces.

4. In a device for exhibiting the numerical value of a condition under measurement, in combination, a member positionable by a condition responsive mechanism, a plurality of series of stepped surfaces upon the member comprising a series of steps for each order of digits and steps in each series for each digit represented thereby, the last steps in the series representing units being positioned adjacent to the line of demacartion between steps in the other series and extending radially beyond the highest steps of the other series, a plurality of fingers radially movable to engage the stepped surfaces, one finger for each series of stepped surfaces, and means actuated by engagement of the units finger with the last steps of the units series of steps for shifting the other fingers to vary the point of engagement of the other fingers on the other stepped surfaces.

5. In a device for exhibiting the numerical value of a condition under measurement, in combination, a member positionable by a condition responsive instrument in accordance with the condition to be measured, the member having a plurality of series of stepped surfaces about its periphery comprising a series of steps for each order of digits in the result to be exhibited and steps in each series for the digits of such order, the outermost steps in the series representing digits being disposed adjacent the demacartion line between higher order steps, a plurality of fingers one for each series radially movable to engage the steps on said member, a shiftable plate for guiding those fingers cooperating with the series representing higher orders of digits, and means for shifting the plate upon engagement of the units finger with the outermost steps of the units series of steps.

6. In a device for exhibiting the numerical value of a condition under measurement, in combination, a member positionable by a condition responsive instrument in accordance with the condition to be measured, the member having a plurality of series of stepped surfaces about its periphery comprising a series of steps for each order of digits in the result to be exhibited and steps in each series for the digits of such order, the outermost steps in the series representing units digits being disposed adjacent the demarcation line between higher order steps, a plurality of fingers one for each series radially movable to engage the steps on said member, a shiftable plate for guiding those fingers cooperating with the series representing higher orders of digits and when shifted for locking the units finger against further motion, and means for shifting the plate upon engagement of the units finger with the outermost steps of the units series of steps.

HENRY KENNEDY LEONARD.